(12) United States Patent
Kummetz et al.

(10) Patent No.: US 8,997,368 B2
(45) Date of Patent: Apr. 7, 2015

(54) LENGTH MEASURING DEVICE

(75) Inventors: Jens Kummetz, Traunstein (DE); Dirk Geyermann, Vachendorf (DE); Martin Seichter, Wonneberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 312 days.

(21) Appl. No.: 13/549,842

(22) Filed: Jul. 16, 2012

(65) Prior Publication Data

US 2013/0019489 A1      Jan. 24, 2013

(30) Foreign Application Priority Data

Jul. 20, 2011   (DE) .......................... 10 2011 079 464

(51) Int. Cl.
 *G01B 5/14*      (2006.01)
 *G01D 5/347*      (2006.01)
(52) U.S. Cl.
 CPC ................................. *G01D 5/34707* (2013.01)
(58) Field of Classification Search
 CPC .... F16C 29/00; F16C 29/0633; F16C 41/007; F16C 41/00; G01D 5/34707; G01D 5/34753; G01D 5/2457; G01D 5/34769; G01D 5/24438; G01D 5/347; G01B 3/002
 USPC ...................................................... 33/703–710
 See application file for complete search history.

(56) References Cited

U.S. PATENT DOCUMENTS 3,816,003 A * 6/1974 Litke ................................ 33/707
4,060,903 A * 12/1977 Ernst ................................ 33/706
4,593,471 A * 6/1986 Nelle ............................... 33/702
5,115,573 A * 5/1992 Rieder et al. .................... 33/706
5,253,430 A * 10/1993 Rieder et al. .................... 33/702
5,655,311 A * 8/1997 Affa ................................. 33/706
6,739,067 B2 * 5/2004 Muller ............................ 33/703
7,284,338 B2 * 10/2007 Hager et al. .................... 33/706
7,591,080 B2 * 9/2009 Fiedler et al. ................... 33/706
7,788,821 B2 * 9/2010 Affa et al. ....................... 33/706
7,895,766 B2 * 3/2011 Rudy et al. ..................... 33/708
2002/0066201 A1 * 6/2002 Boge et al. ...................... 33/706
2002/0129508 A1 * 9/2002 Blattner et al. ................. 33/706
2002/0184782 A1 * 12/2002 Henshaw et al. ............... 33/706
2003/0182816 A1 * 10/2003 Huber et al. .................... 33/707
2003/0200671 A1 * 10/2003 Muller ............................ 33/706
2005/0046413 A1 * 3/2005 Schmidt et al. ............... 324/164
2007/0079519 A1 * 4/2007 Hager et al. .................... 33/706
2008/0078096 A1 * 4/2008 Matsumura et al. ............ 33/706
2013/0019489 A1 * 1/2013 Kummetz et al. .............. 33/770

FOREIGN PATENT DOCUMENTS

DE         43 18 017 A1    12/1994

* cited by examiner

*Primary Examiner* — Yaritza Guadalupe-McCall
(74) *Attorney, Agent, or Firm* — Brinks Gilson & Lione

(57) ABSTRACT

A length measuring device for measuring a position in a measuring direction of a first object and a second object displaceable relative to one another. The device includes a hollow profile, a scale and a fastening element. The fastening element includes a first portion designed to fix the scale in stationary fashion in a measuring direction and to fix the first portion in stationary fashion in the measuring direction on the first object to be measured. The fastening element also includes a second portion with which the fastening element is fastened on the hollow profile. The length measuring device further includes a length compensation element provided between the first portion and the second portion of the fastening element, wherein the length compensation element is embodied for enabling motion of the first portion relative to the second portion in the measuring direction.

13 Claims, 8 Drawing Sheets

LENGTH MEASURING DEVICE

RELATED APPLICATIONS

Applicants claim, under 35 U.S.C. §119, the benefit of priority of the filing date of Jul. 20, 2011 of a German patent application, copy attached, Serial Number 10 2011 079 464.6, filed on the aforementioned date, the entire contents of which is incorporated herein by reference.

BACKGROUND

1. Technical Field

The present invention relates to a length measuring device for measuring the position of two objects that are displaceable relative to one another. To protect the scale, the scale is disposed inside a hollow profile of the length measuring device, extending in the measuring direction. Such a length measuring device serves to measure lengths, travel paths, and positions, and is employed especially in machining equipment for measuring the relative motion of a tool with respect to a workpiece that is to be machined, in coordinate measuring machines, and increasingly in the semiconductor industry as well.

2. Background Information

Often, it is necessary that the length measuring device be embodied for measuring especially long travel paths over several meters. One such length measuring device is described for instance in German patent disclosure DE 43 18 017 A1. The length measuring device there includes a plurality of parts in the form of hollow profiles disposed in succession in the measuring direction. A scale in the form of a measuring tape extends in a groove in the hollow profiles over all the hollow profiles and is clamped via a fastening element inside the measurement range to one of the hollow profiles. That hollow profile is in turn fixed by screws in stationary fashion on the object to be measured.

A disadvantage of this is that the seals on the ends must, on the one hand, securely seal the hollow profiles from one another and, on the other hand, they must enable mechanical uncoupling. The seals are therefore the cause of relatively major contrary forces on the fastening element, which adversely affects the measurement accuracy.

OBJECTS AND SUMMARY OF THE INVENTION

It is therefore an object of the present invention to create an easily manipulated, stable length measuring device which has high measurement accuracy.

This object is attained by a length measuring device for measuring a position in a measuring direction of a first object and a second object displaceable relative to one another. The device includes a hollow profile, a scale and a fastening element. The fastening element includes a first portion designed to fix the scale in stationary fashion in a measuring direction and to fix the first portion in stationary fashion in the measuring direction on the first object to be measured. The fastening element also includes a second portion with which the fastening element is fastened on the hollow profile. The length measuring device further includes a length compensation element provided between the first portion and the second portion of the fastening element, wherein the length compensation element is embodied for enabling motion of the first portion relative to the second portion in the measuring direction.

According to the present invention, the length measuring device for measuring the position of two objects displaceable relative to one another has a hollow profile, in the interior of which a scale is disposed. The length measuring device further includes a fastening element, which has a first portion that is designed, on the one hand, to fix the scale thereon in stationary fashion and, on the other hand, to fix the first portion in stationary fashion on one of the objects to be measured. The fastening element has at least one second portion, with which the fastening element is fastened on the hollow profile. Between the first portion and the second portion of the fastening element, at least one length compensation element is provided, which is embodied for enabling motions of the first portion relative to the second portion in the measuring direction.

The at least one length compensation element can be an array of solid-state joints. Each of these solid-state joints allows a relative motion between the first portion and the second portion by flexing and is embodied as a connection region of reduced flexibility between the first and second portions.

The site of the firm fixation of the first portion to the object to be measured forms the reference point of the length measuring device relative to the measuring object in the measuring direction. "In stationary fashion" here means a fastening that is nondisplaceable in the measuring direction X.

By the present invention, uncoupling of the fastening element from the hollow profile is ensured, so that no contrary forces are exerted on the fastening element. Thus, high measurement accuracy and, in particular, replicability of the position measurement are attained, along with good thermal stability of the reference point.

The hollow profile can be manipulated with the fastening element, which simplifies the mounting on the object to be measured.

The material of the hollow profile as a rule includes a material, such as aluminum, that has a higher coefficient of thermal expansion than the material of the fastening element. As the material for the fastening element, steel or a so-called zero-expansion material, such as INVAR, is suitable. By the present invention, it is ensured that while the hollow profile is capable of thermally dictated expansion, it does not exert impermissible forces on the fastening element and, thus, on the reference point, which could adversely affect the accuracy of the length measuring device.

The fastening element of the present invention is integrated with a hollow profile and can be manipulated easily together with the hollow profile. This is advantageous when the length measuring device includes a plurality of hollow profiles disposed in succession in the measuring direction, which are each sealed off at their connection points by an elastic sealing structure. This is also advantageous when the scale extends over the plurality of hollow profiles, wherein one of these plurality of hollow profiles has the fastening element. The function of the face-end seal and of the mechanical decoupling is separate. Accordingly, the sealing structure and the fastening element can both be designed such that they are individually optimized and have integrated decoupling.

The scale is preferably fixed in stationary fashion over its entire length solely on the fastening element in the measuring direction. Otherwise, that is, extending to either side of the fastening element, the scale is longitudinally displaceable relative to the plurality of hollow profiles and relative to the object to be measured. This longitudinal displaceability can be effected by simply resting the scale on the hollow profiles.

The friction between the scale and the hollow profiles can be reduced by additional provisions, such as an elastic intermediate layer.

The at least one length compensation element is in particular embodied such that it allows motion of the first portion relative to the second portion solely in the measuring direction. In addition, the at least one length compensation element blocks motion in all the other directions, that is, the remaining 5 degrees of freedom, thereby ensuring great resistance of the length measuring device to vibration. The at least one length compensation element can be embodied as a low-friction linear guide. Advantageously, the at least one length compensation element is an array of solid-state joints. The solid-state joints each have a strut, extending perpendicular to the measuring direction, which extends between the first portion and the second portion. The strut is connected by one end to the first portion and by the other end to the second portion of the fastening element and in particular is formed integrally with it. The strut is deflectable solely in the measuring direction.

It is especially advantageous if, as described in detail in the exemplary embodiment described below, the scale is guided in the hollow profile in the measuring direction by a first guide. This first guide is preferably a groove made in the hollow profile in which the scale is supported with low friction and displaceably in the measuring direction. The first guide is designed in particular for fixing the scale in the remaining 5 degrees of freedom.

A second guide in the measuring direction forms the at least one length compensation element. This second guide guides the hollow profile on the fastening element in the measuring direction. This second guide also is designed for fixing the scale in the remaining 5 degrees of freedom.

The scale is preferably fixable in any arbitrary position on the fastening element, and the fastening element is also preferably detachable again without leaving any residue. To that end, the first portion of the fastening element is designed in particular for fixing the scale in stationary fashion on this first portion by clamping. The clamping has the advantage that the scale can be detached from the fastening element as needed. The clamping mechanism is accessible and activatable from outside.

The first portion has supports, preferably spaced apart from one another transversely to the measuring direction, for supporting the scale by its underside with the scale resting freely between the two supports. The first portion moreover has two abutments, spaced apart from one another transversely to the measuring direction X, which upon the clamping enter into contact with the top side of the scale and clamp the scale in place between the supports and the abutments. These abutments are embodied in the form of folded joints that grip the scale at its edges and leave the measurement graduation of the scale free for scanning purposes.

For the stationary fixation of the first portion on the object to be measured, this portion has a bore, for example, for receiving a screw within. The stationary fixation of the first portion corresponds to the object to be measured, for example, being screwed into place there.

The second portion can have two partial portions spaced apart from one another in the measuring direction X. The second portion can also have at least one length compensation element, in particular in the form of at least one solid-state joint, which is provided between each of the two partial portions and the first portion. Each of the two partial portions is fastened to the hollow profile by screws.

The scale is preferably a measuring tape that is longitudinally stable but flexible, in particular a steel band.

The present invention will be described in further detail in terms of exemplary embodiments.

In the drawings:

DETAILED DESCRIPTION OF THE PREFERRED EMBODIMENTS

Figure 1:
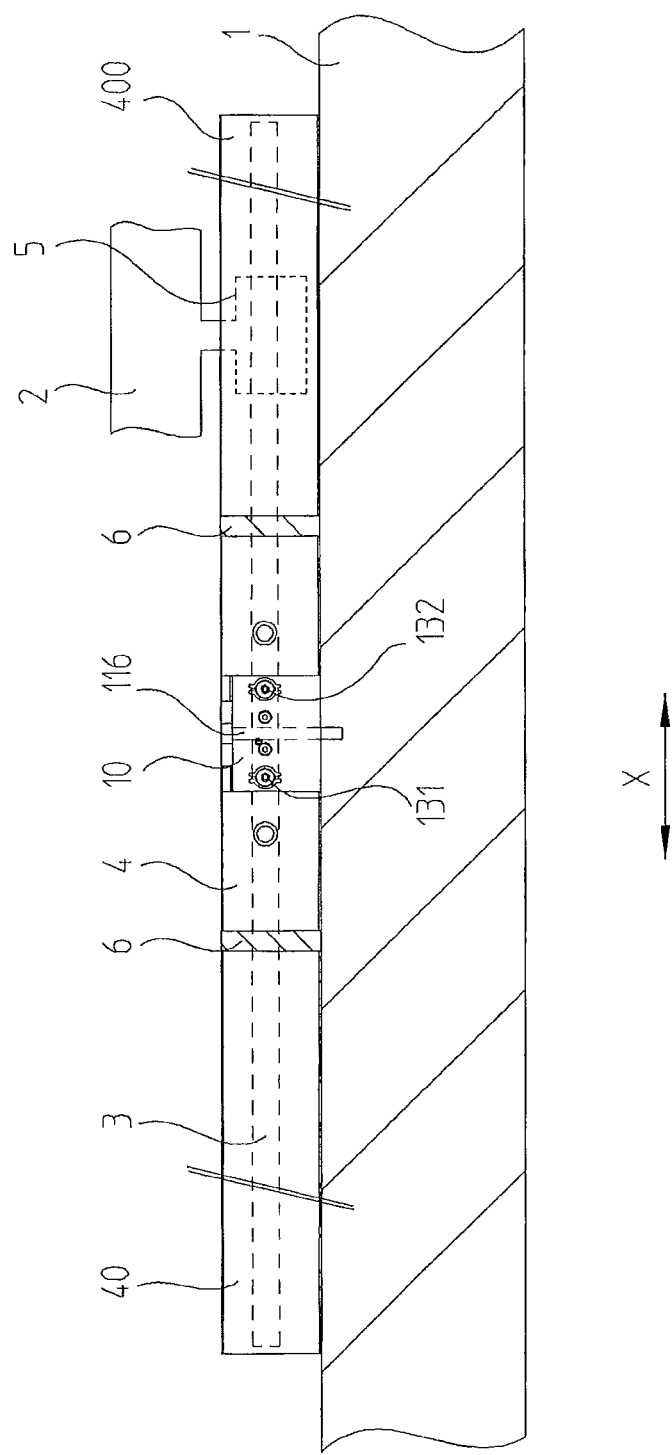
FIG. 1 is a view of an embodiment of a length measuring device in the mounted state in accordance with the present invention.
Figure 2:
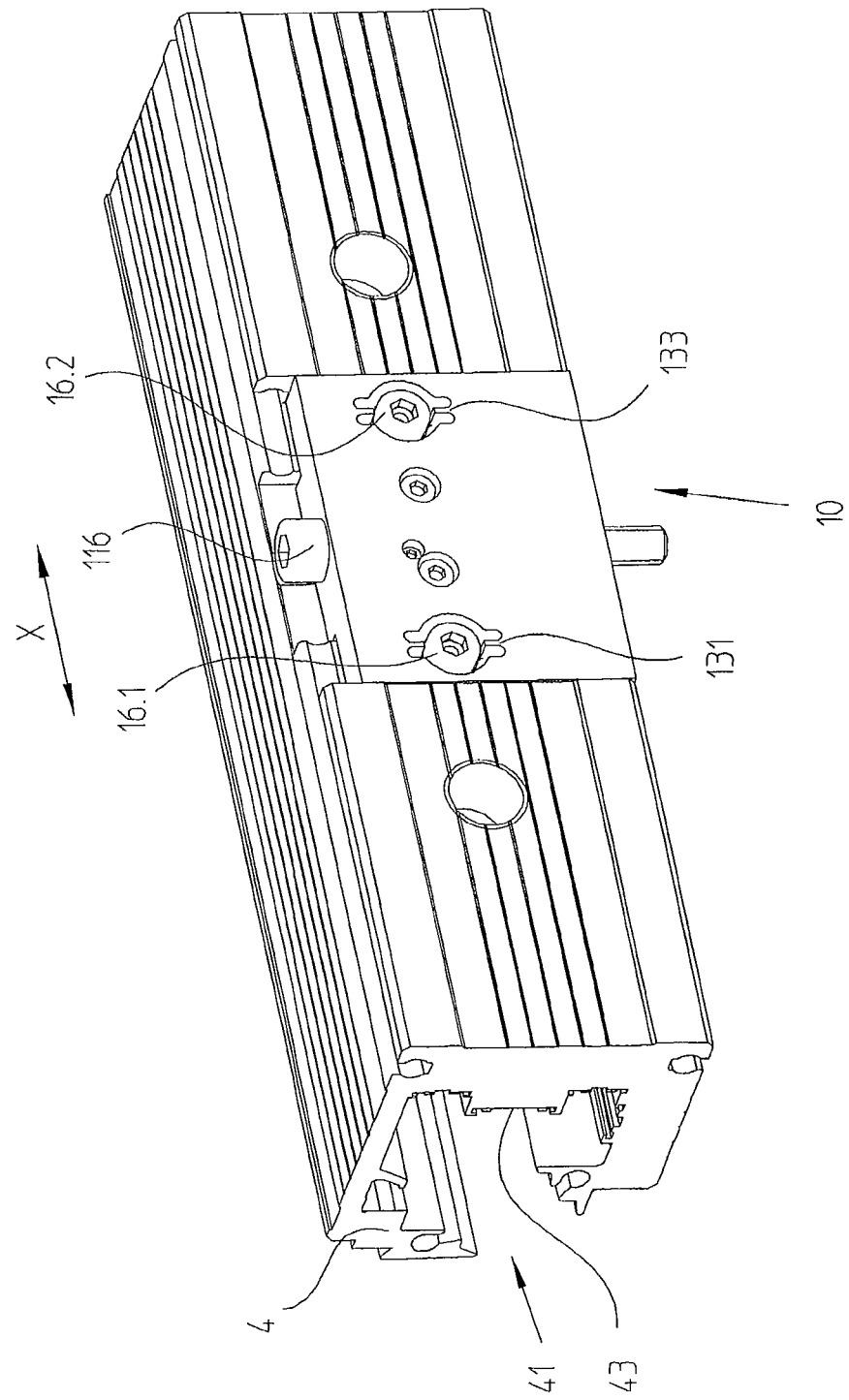
FIG. 2 is a first view of an embodiment of a hollow profile of the length measuring device of FIG. 1 in accordance with the present invention.

FIG. 1 shows a length measuring device for measuring the position of two objects 1, 2 that are displaceable relative to one another. The length measuring device is a so-called encapsulated system, in which a scale 3 (shown here only schematically) is disposed, extending in the measuring direction X, inside a hollow profile 4. A scanning head 5 that scans a measurement graduation of the scale 3 is likewise disposed in protected fashion inside the hollow profile 4. The scanning head 5 is guided in the measuring direction X in the hollow profile 4 by being braced, for example, by rollers on the hollow profile 4 and/or on the scale 3. The hollow profile 4 is connected to one of the objects to be measured, that is, to object 1, and the scanning head 5 is connected to the other of the objects to be measured, that is, to object 2. This connection of the scanning head 5 to the object 2 to be measured is effected in a known manner via a sword-shaped slaving device, which is extended to the outside through a slit 41 that extends in the measuring direction X as shown in FIG. 2. The slit 41 in the hollow profile 4 is sealed off by sealing lips (not shown for the sake of simplicity), to avert the penetration of dirt and splashing water into the interior of the hollow profile 4.

Figure 3:
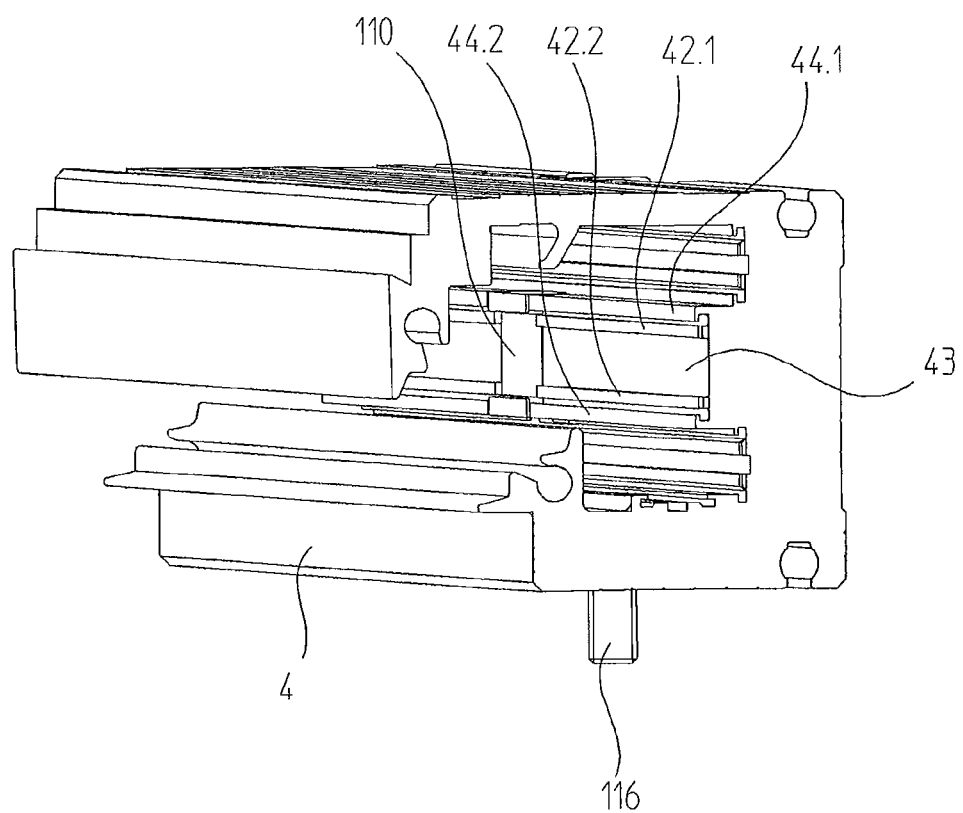
FIG. 3 is a second view of the hollow profile of FIG. 2, without the scale.
Figure 4:
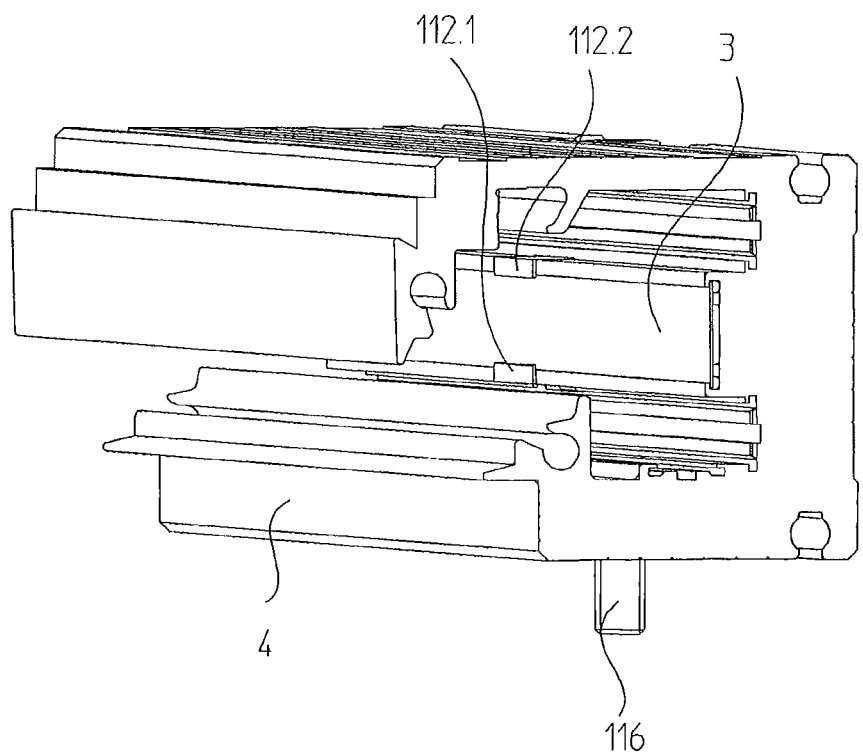
FIG. 4 is the second view of the hollow profile of FIG. 3, with the scale.

The scale 3 is preferably a thin, flexible measuring tape, which is longitudinally stable in the measuring direction, which is why a steel band is especially suitable. The scale 3, on its top side, has a photoelectrically scannable measurement graduation, which is scanned by the scanning head 5 by the so-called incident-light method. The scale rests with its underside on a support face in the form of struts 42.1, 42.2 of the hollow profile 4 as shown in FIG. 3. A groove 43 of the hollow profile 4 forms the support face (in this example, the struts 42.1, 42.2) for the scale 3, on the one hand, and, on the other hand, it advantageously has folded joints 44.1, 44.2, which form a two-sided grip for the scale 3. The groove 43 forms an interstice into which the scale 3 can be thrust in the measuring direction X, but in directions transverse to the measuring direction the scale has only negligible play. In FIGS. 2 and 3, the groove 43 is shown without the scale 3 placed in it, and in FIG. 4 it is shown with the scale 3 thrust into it.

The groove 43 forms a guide for the hollow profile, wherein the scale is supported displaceably in the guide in the measuring direction with little friction. This guide is also embodied such that the scale 3 is fixed in the remaining 5 degrees of freedom.

In FIG. 1, it is shown how the length measuring device is embodied for measuring relatively great measurement lengths. A plurality of hollow profiles 4, 40, 400 are disposed in the measuring direction X in succession on the object 1 to be measured. The connection points between each two adjacent hollow profiles 4, 40, 400 are sealed off from one another by seals 6. Once the individual hollow profiles 4, 40, 400 have been mounted on the object 1 to be measured, the scale 3 is thrust or pulled into the groove 43 of the hollow profiles 4, 40, 400. The scale 3 then extends in one piece over all the hollow profiles 4, 40, 400.

The hollow profile 4 has a fastening element 10, which, on the one hand, is embodied for forming a neutral point or reference point of the scale 3 relative to the object 1 to be measured. On the other hand, the fastening element is mounted on the hollow profile 4 in decoupled fashion in the measuring direction X. To that end, the fastening element 10 has a first portion 11, which is designed for fixing the scale 3 on the fastening element in stationary fashion. The first portion 11 is furthermore designed for being fixed in stationary fashion on the object 1 to be measured. As a result, the scale 3 is fixed in stationary fashion on the first portion 11 in the position—viewed in the measuring direction X—at which the first portion 11 is also fixed in stationary fashion on the object 1 to be measured.

On both sides of the first portion 11, the scale 3 is disposed extending in the measuring direction X relative to the hollow profile 4, so that the fastening element 10 is located inside the measurement range. The scale 3 is fixable in stationary fashion over its entire length solely via the fastening element 10 on the object to be measured. This means that on the one hand, the scale 3, on both sides of the fastening element 10 and over its entire length, is mounted in decoupled fashion from the hollow profile 4 in such a way that relative changes in length between the scale 3 and the hollow profile 4 are possible. On the other hand, except at the reference point, the scale is not connected in stationary fashion to the object 1 to be measured. This decoupled disposition of the scale 3 can be implemented by resting the scale 3 on the bottom of the groove 43, and, in addition, a friction-reducing structure, for instance in the form of an intermediate layer, can be provided between the bottom of the groove 43 and the scale 3.

The stationary fixation of the scale 3 on the first portion 11 is preferably effected by clamping with the advantage that the fixation is detachable so that the scale 3 can easily be removed from out of the hollow profile 4 as needed.

Figure 5:
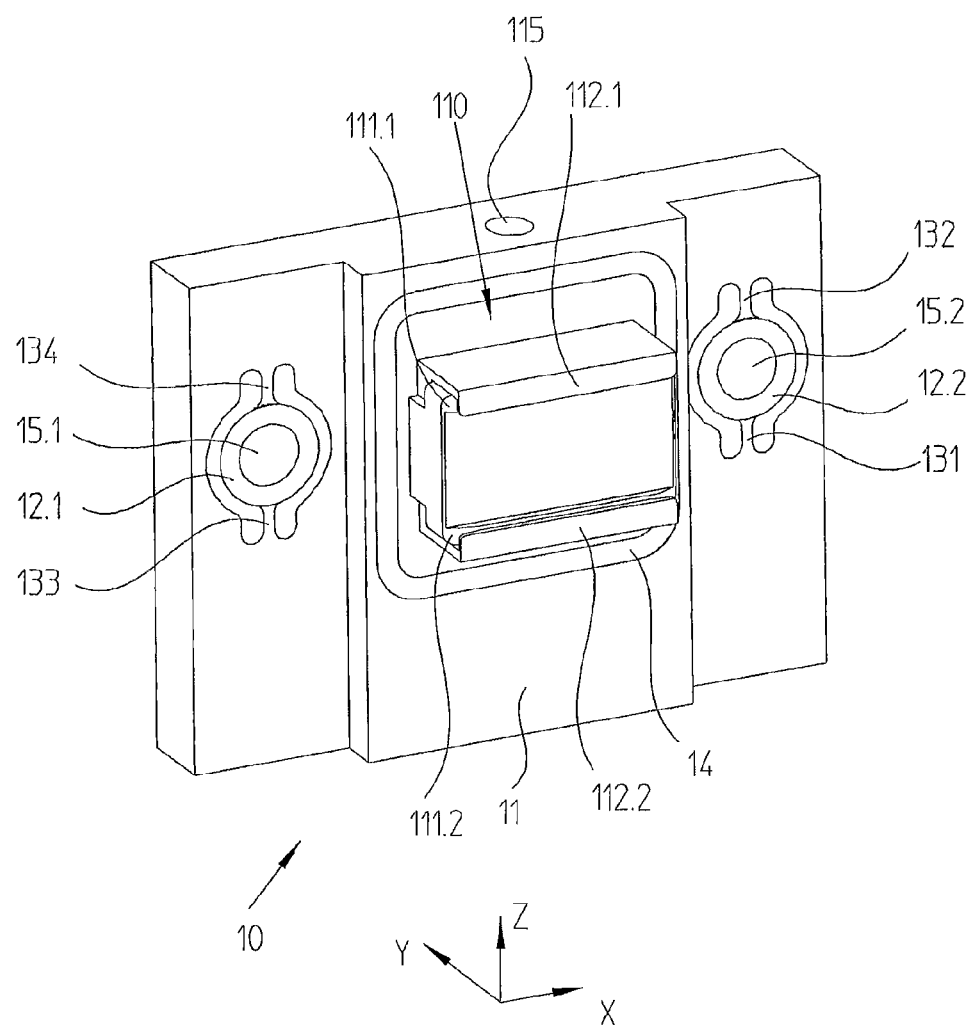
FIG. 5 is a first view of an embodiment of a fastening element of the hollow profile of FIG. 2 in accordance with the present invention.
Figure 6:
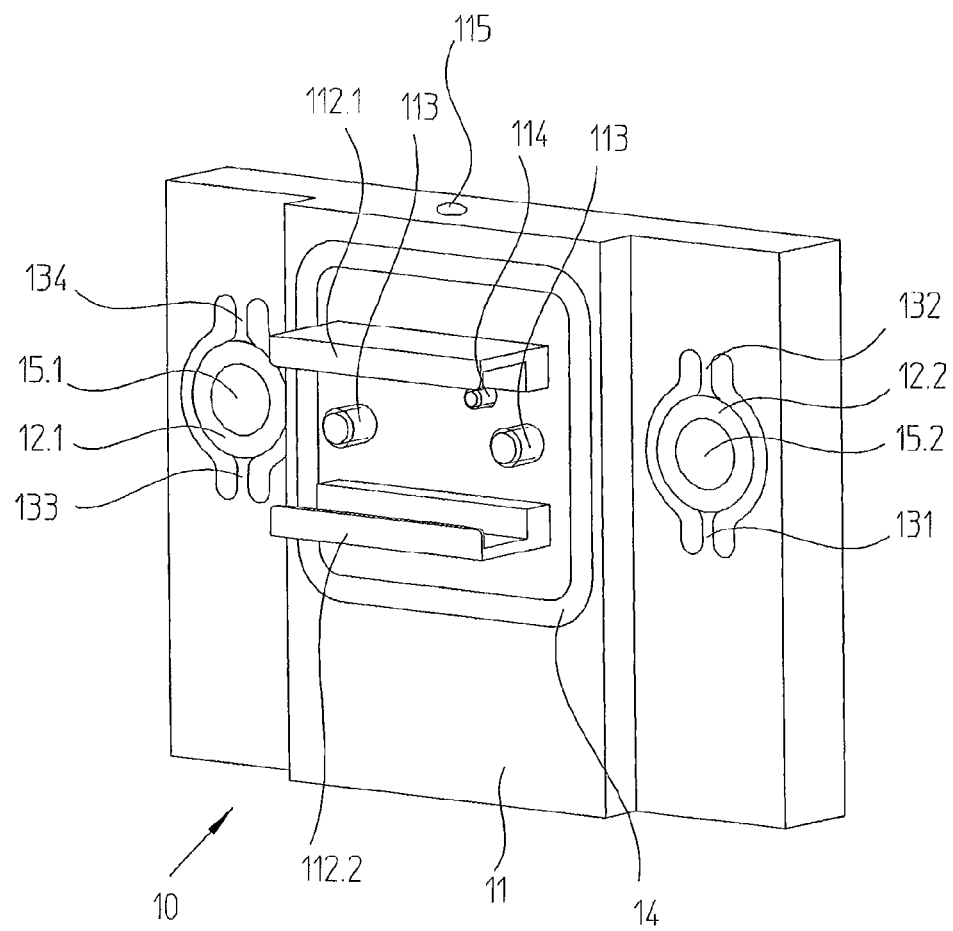
FIG. 6 is a second view of the fastening element of the hollow profile of FIG. 5.
Figure 7:
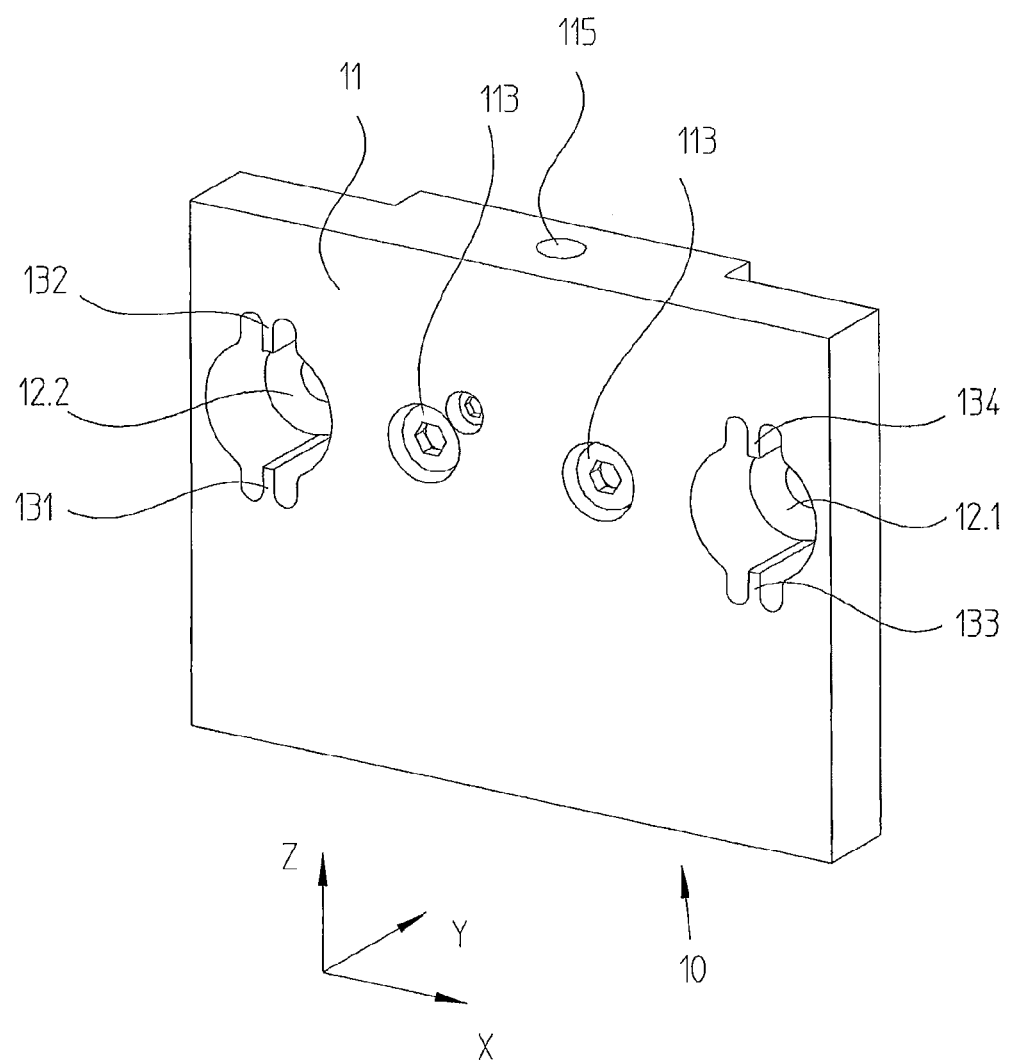
FIG. 7 is a third view of the fastening element of the hollow profile of FIG. 5.

A first exemplary embodiment of an advantageously designed fastening element 10 is shown in various views in FIGS. 5-7. For the stationary clamping of the scale 3 to the first portion 11, the latter has a clamping mechanism 110, with which the scale 3 can be clamped to the first point 11. To that end, the clamping mechanism 110 has a support element for supporting the scale 3 by its underside. The support element has two supports 111.1, 111.2, spaced apart from one another transversely to the measuring direction X, such that the scale 3 rests only on the two edges and is free in the middle. The clamping mechanism 110 also has two abutments 112.1, 112.2, which upon clamping enter into contact with the top side of the scale 3 and clamp the scale 3 in place between the faces of the supports 111.1, 111.2 and the abutments 112.1, 112.2. The abutments 112.1, 12.2, in the example shown, include two folded joints, which upon clamping at the two edges enter into contact with the top side of the scale 3. The two folded joints leave extending between them the measurement graduation of the scale 3 free, so that the measurement graduation can be scanned by the scanning head 5 without hindrance.

The support element (in the example, having the two strut-like supports 111.1, 111.2) is capable of being shifted in the direction of the abutment (in the example, the two strut-like abutments 112.1, 12.2) perpendicular to the measuring direction X. This shifting is implemented by screws. In order to introduce the scale 3 as easily as possible between the support and the abutment upon assembly, the support can be retracted from the abutment by a screw 114.

For clamping the scale 3, it is alternatively possible for the abutment 112.1, 12.2 to be embodied as shiftable toward the supports 111.1, 111.2.

To enhance the clamping action or, in other words, the static friction, preferably at least one of the clamping surfaces is roughened, for instance by sandblasting or etching. The stationary fixation of the scale 3 to the first portion 11 can additionally be improved by form locking.

The clamping mechanism 110 is designed such that the clamping can be undone. For activating and deactivating the clamping, the fastening element, for instance in the form of one or more screws 113, is accessible and actuatable transversely to the measuring direction X from outside.

The supports 111.1, 111.2 and/or the abutments 112.1, 112.2 have introduction-facilitating chamfers on both ends for the sake of easy introduction of the scale 3, as can be seen especially in FIG. 5. The gap embodied between each of the supports 111.1, 111.2 and abutments 112.1, 112.2 is largest toward the end and decreases continuously up to the clamping region.

The first portion 11 of the fastening element 10 is moreover additionally embodied for fixing the fastening element in stationary fashion on the object 1 to be measured. To that end, the first portion 11 has a bore 115 for receiving a screw 116 (see FIGS. 1 and 2), which corresponds with the object 1 to be measured when the first portion 11 is fixed in stationary fashion.

The fastening element 10 moreover has at least one second portion by which it is fastened to the hollow profile 4. In the example shown in FIGS. 5-7, the second portion is formed by two partial portions 12.1 and 12.2. The fastening on the hollow profile 4 is effected such that between the first portion 11 and the two partial portions 12.1, 12.2, length compensation in the measuring direction X is made possible. To that end, at least one length compensation element is embodied in particular as an array of solid-state joints 131, 132, 133, 134, which makes a motion of the first portion 11 relative to the two partial portions 12.1, 12.2 in the measuring direction X possible.

The array of solid-state joints 131, 132, 133, 134 is preferably embodied such that it allows a relative motion of the first portion 11 relative to the two partial portions 12.1, 12.2 solely in the measuring direction X and blocks motions in all other directions. To that end, each solid-state joint 131, 132, 133, 134 is embodied as a strut-like element, which extends perpendicular to the measuring direction X and is deflectable solely in the measuring direction X. The strut-like elements block a motion of the first portion 11 relative to the two partial portions 12.1, 12.2 in directions in which they extend, or in other words in the Y and Z directions (shown in FIG. 7).

The array of solid-state joints 131, 132, 133, 134 is, for example, a symmetrical array on both sides of the first portion 11. The second portion for that purpose has two partial portions 12.1, 12.2, spaced apart from one another in the measuring direction X, and between each of the two partial portions 12.1, 12.2 and the first portion 11 there is at least one solid-state joint 131, 132, 133, 134. The solid-state joints 131, 132, 133, 134 embodied as strut-like elements each originate at the first portion 11 and extend to the second portion (in the example, to at least one of the two partial portions 12.1, 12.2) perpendicular to the measuring direction X and are deflectable in the measuring direction X in a manner similar to a leaf spring. The second portion—here in the form of two partial portions 12.1, 12.2—is fastened to the hollow profile 4 by screws 16.1, 16.2. To that end, each of the two partial portions 12.1, 12.2 has a corresponding bore 15.1, 15.2.

The fastening element 10 having the first portion 11 and the at least one second portion 12.1, 12.2 is embodied in the form of an insert part, which can be mounted on the hollow profile 4 from outside. To that end, the hollow profile 4 has an externally accessible opening through which the clamping mechanism 110 of the first portion 11 protrudes into the interior of the hollow profile 4, as can be seen from FIG. 3. This lateral opening in the hollow profile 4 is sealed off by a seal 14, in particular a flat seal, which is disposed between a side wall of the hollow profile 4 and the fastening element 10. This seal 14 is shown particularly in FIGS. 5 and 6. The seal 14 is disposed—viewed in the measuring direction X—between the first portion 11 and each of the solid-state joints 131, 132, 133, 134. Since as a result the seal 14 is not subjected to compression in the measuring direction X, the introduction of force caused by the seal in the measuring direction X is negligible.

Figure 8:
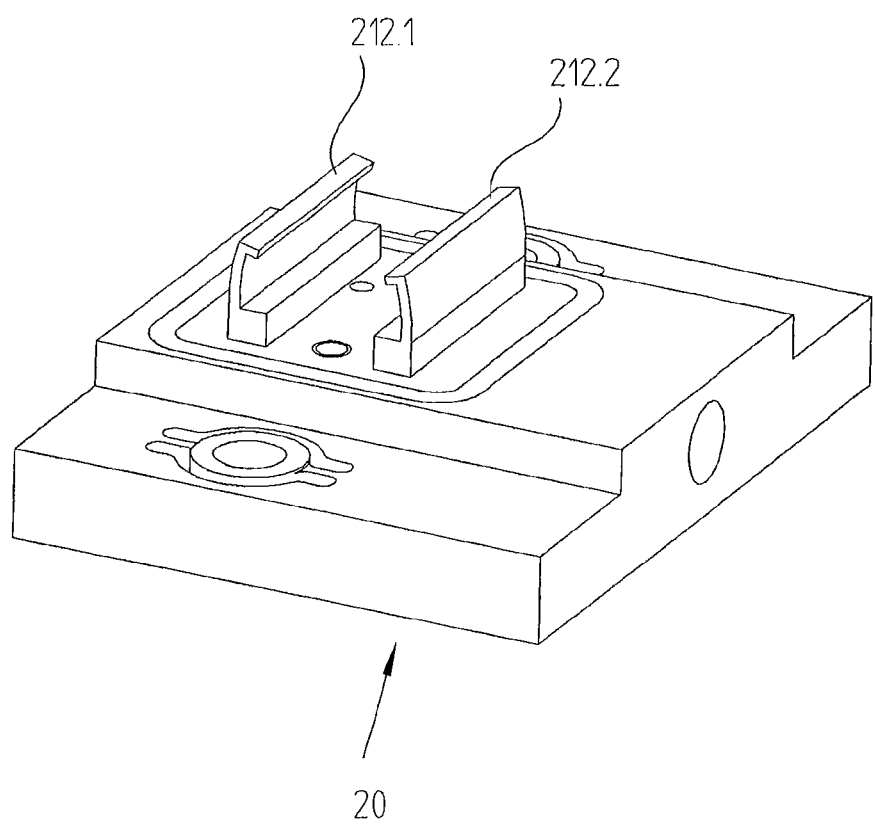
FIG. 8 shows a further embodiment of a fastening element to be used in the length measuring device of FIG. 1 and the hollow profile of FIG. 2 in accordance with the present invention.

In FIG. 8, a further embodiment of a fastening element 20 is shown to be used with the hollow profiles 4, 40, 400 and the measuring device of FIG. 1. Unlike the fastening element 10 described above, the abutments in the form of folded joints 212.1, 212.2 in the unclamped state do not extend parallel to the scale 3. Instead, they point with their free ends in the direction of the scale 3 (embodied in particular as a measuring tape). This provision serves to compensate for sagging when force is introduced by the action clamping process. Deformation of the scale 3 (arching transversely to the measuring direction X) is thus avoided, and the measurement accuracy of the length measuring device is not adversely affected by the clamping process.

If high-precision position measurement is desired, the measurement graduation of the scale is designed to be photoelectrically scannable. The measurement graduation can alternatively also be designed to be scannable magnetically, capacitively, or inductively.

It is understood that the present invention is not limited to the exemplary embodiments described; on the contrary, further embodiments that are familiar to one skilled in the art are also within the scope of the intellectual considerations of to the present invention.

We claim:

1. A length measuring device for measuring a position in a measuring direction of a first object and a second object displaceable relative to one another, the device comprising:
    a hollow profile;
    a scale;
    a fastening element comprising:
        a first portion designed to fix said scale in stationary fashion in a measuring direction on said hollow profile and to fix said first portion in stationary fashion in said measuring direction on said first object to be measured; and
        a second portion with which said fastening element is fastened on said hollow profile; and
    a length compensation element provided between said first portion and said second portion of said fastening element, wherein said length compensation element is embodied for enabling motion of said first portion relative to said second portion in said measuring direction.

2. The length measuring device according to 1, wherein said length compensation element is embodied to enable motion of said first portion relative to said second portion solely in said measuring direction and blocks motions in all other directions.

3. The length measuring device according to claim 2, wherein said length compensation element comprises an array of solid-state joints.

4. The length measuring device according to claim 3, wherein each of said solid-state joints comprises a flexible strut that extends perpendicular to said measuring direction and extends between said first portion and said second portion.

5. The length measuring device according to claim 1, wherein said first portion is designed for fixing said scale in stationary fashion on said first portion by clamping.

6. The length measuring device according to claim 5, wherein said first portion comprises:
    supports spaced apart from one another transversely to said measuring direction for supporting an underside of said scale; and
    two abutments spaced apart from one another transversely to said measuring direction, which upon said clamping come into contact with a top side of said scale and clamp said scale between said supports and said two abutments.

7. The length measuring device according to claim 1, wherein said first portion has a bore for receiving a screw, which upon stationary fixation of said first portion corresponds said first object to be measured.

8. The length measuring device according to claim 1, wherein said second portion comprises:
    two partial portions spaced apart from one another in said measuring direction; and
    a length compensation element disposed between of each of said two partial portions and said first portion.

9. The length measuring device according to claim 8, wherein each of said two partial portions is fastened to said hollow profile by a screw.

10. The length measuring device according to claim 1, wherein said scale comprises a measuring tape.

11. The length measuring device according to claim 1, wherein said hollow profile has a groove extending in said measuring direction, wherein said scale is disposed in said groove.

12. The length measuring device according to claim 1, further comprising a second hollow profile that is disposed in succession with said hollow profile in said measuring direction and said hollow profile and said second hollow profile are attached to one another at a connecting point, wherein said hollow profile and said second hollow profile are sealed off at said connecting point by an elastic sealing structure, and wherein said scale extends over said hollow profile and said second hollow profile, wherein said hollow profile comprises said fastening element.

13. The length measuring device according to claim 12, wherein said scale is fixed in stationary fashion in said measuring direction solely to said fastening element and otherwise said scale is disposed longitudinally displaceably relative both to said hollow profile and said second hollow profile and to said first object to be measured.

\* \* \* \* \*